United States Patent [19]

Jäger et al.

[11] Patent Number: 4,646,408

[45] Date of Patent: Mar. 3, 1987

[54] DEVICE FOR FASTENING TOGETHER THE PARTS OF A HEAT-INSULATED COMPOSITE SECTION

[75] Inventors: Tilo Jäger; Armin Tönsmann, both of Bielefeld; Siegfried Habicht, Leopoldshohe; Eitel Höcker, Bielefeld, all of Fed. Rep. of Germany

[73] Assignee: Schuco Heinz Schurmann GmbH & Co., Bielefeld, Fed. Rep. of Germany

[21] Appl. No.: 612,981

[22] Filed: May 23, 1984

[30] Foreign Application Priority Data

May 27, 1983 [DE] Fed. Rep. of Germany ....... 3319262

[51] Int. Cl.⁴ ............ B23P 11/00

[52] U.S. Cl. ............ 29/243.5

[58] Field of Search ............ 29/243.5, 283.5, 796, 29/788; 100/210

[56] References Cited

U.S. PATENT DOCUMENTS

| | | | |
|---|---|---|---|
| 2,159,771 | 5/1939 | Schlicht | 29/243.5 |
| 4,213,236 | 7/1980 | Diels et al. | 29/243.5 |
| 4,245,384 | 1/1981 | Egerer | 29/243.5 X |

FOREIGN PATENT DOCUMENTS

| | | | |
|---|---|---|---|
| 2825301 | 12/1979 | Fed. Rep. of Germany | 29/243.5 |
| 3025706 | 1/1982 | Fed. Rep. of Germany | 29/283.5 |

*Primary Examiner*—Frederick R. Schmidt
*Assistant Examiner*—Steven P. Schad
*Attorney, Agent, or Firm*—Sprung Horn Kramer & Woods

[57] ABSTRACT

A device for fastening together the parts of a heat-insulated composite section consisting of two metal sections and of at least one insulating rod has knurling rollers that shape exterior groove webs, forces them against the insulating rod, provides them with a knurled strip. The knurling roller has conical, toothed, circumferential surfaces. The bottom land between each pair of teeth parallels the conical circumferential surface. The knurling rollers are mounted in a tensioning mechanism that consists of two annular disks in such a way that it can be displaced along its axis. It can be displaced 0.5 to 1 mm to each side out of an intermediate position. The axial flotation make it possible to compensate for errors in alignment between the knurling roller and the composite section that occur while the groove webs are being shaped as a result of undesirable superimposition of the tolerances of the separate parts. The knurling rollers are mounted in such a way that they cannot rotate on powered shafts. They advance the composite section, which is also guided by horizontal and vertical guide rollers, through the device.

4 Claims, 12 Drawing Figures

DEVICE FOR FASTENING TOGETHER THE PARTS OF A HEAT-INSULATED COMPOSITE SECTION

BACKGROUND OF THE INVENTION

The present invention relates to a device for fastening together the parts of a heat-insulated composite section consisting of two metal sections and of at least one insulating rod, in which the insulating rod engages grooves in the metal sections, exterior groove webs can be shaped and forced against the insulating rod by one or more knurling rollers in the device, and each knurling roller is disk-shaped and secured in a mechanism that is fastened on and can be released from a shaft.

The mechanism in the known device of this type consists of two annular disks that rest against the lateral surfaces of the knurling roller and are fastened and forced together by screws that extend through passages bored through the knurling roller. The rigid mounting of the knurling roller leads to considerable problems in practice because the knurling roller must be aligned precisely in the center of the groove webs that are to be shaped in order to perfectly fasten the metal sections to the insulating rod or rods in the vicinity of the joint and the webs must not differ in thickness.

The knurling rollers, however, cannot be precisely aligned with the metal-section groove webs that are to be shaped when the tolerances of the parts to be fastened together are undesirably superimposed.

SUMMARY OF THE INVENTION

The object of the present invention is to provide a device of the aforesaid type that will result in a perfect joint between the separate parts even when their tolerances are superimposed undesirably.

This object is attained in accordance with the invention in that the knurling roller is mounted in the mechanism in such a way that it can be axially displaced.

The knurling roller can be axially displaced 0.5 to 1 mm to each side out of an intermediate position.

In one embodiment of the invention the knurling roller has two separated, conical, toothed, circumferential surfaces, with the bottom land between each pair of teeth paralleling the conical circumferential surface. This improves the transmission of forces from the knurling roller to the groove webs.

The axial displacement of the knurling roller makes it float over the outer metal-section groove webs, which it shapes, forces against the insulating rod, and knurls. The axial flotation makes it possible to compensate for errors in alignment resulting from relative motion between the composite section, which is generally manufactured in 6-meter lengths, and the knurling roller.

In another embodiment of the device in accordance with the invention, the knurling roller is mounted in such a way that it can be displaced axially on a bushing that is held between annular disks and the disks are forced together by screws that extend through passages bored through the knurling roller.

In a further embodiment of the device in accordance with the invention the bushing is in one piece with an annular disk.

In still another embodiment of the device in accordance with the invention the conical circumferential surface of the knurling roller is at an angle $\alpha$ of 50° to 60° to the horizontal.

The known embodiment and the preferred embodiments in accordance with the invention will now be described with reference to the attached drawings, wherein

DETAILED DESCRIPTION OF THE PREFERRED EMBODIMENTS

Figures 1, 1A, 1B:
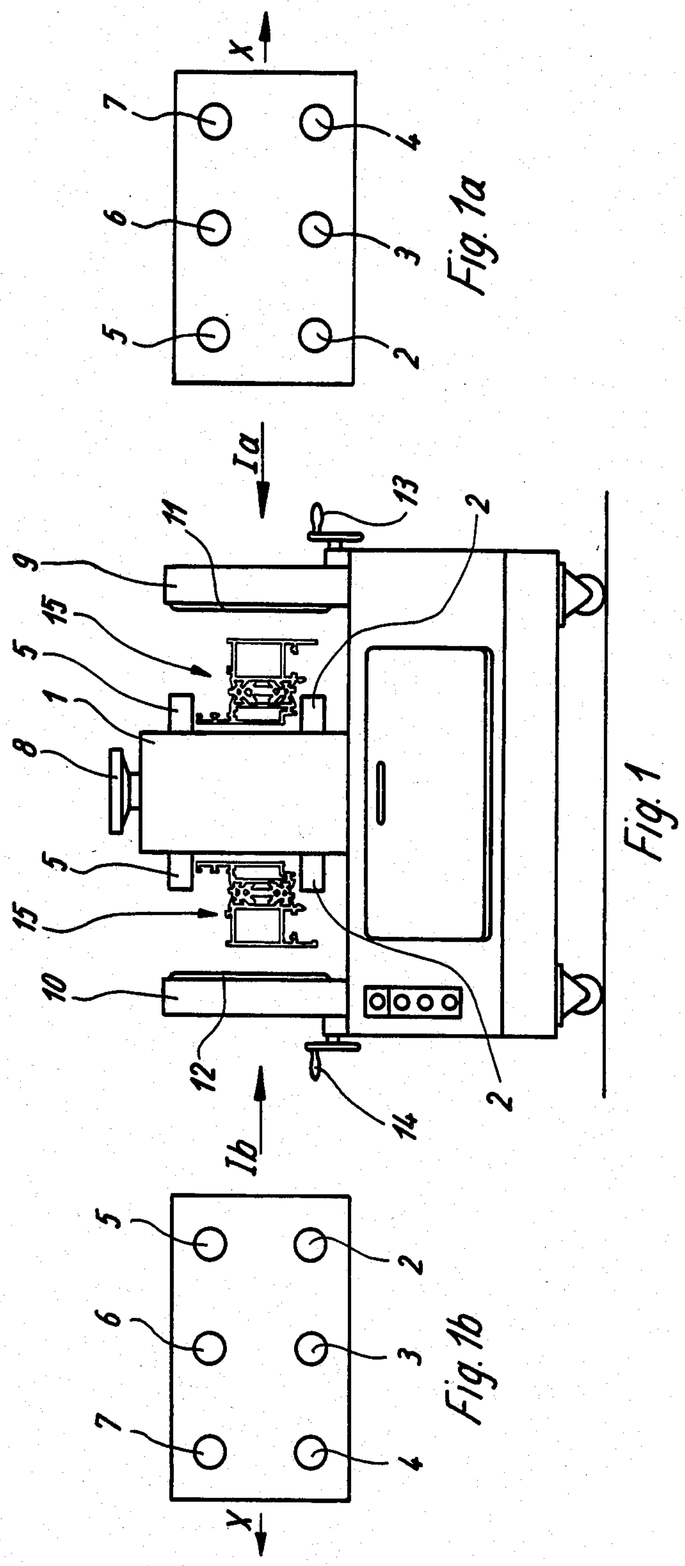
FIG. 1 is an elevation of a known device.
FIG. 1*a* is a view of the central standard along the direction indicated by arrow Ia.
FIG. 1*b* is a view of the central standard along the direction indicated by arrow Ib.

The known device for fastening together the parts of a heat-insulated composite section illustrated in FIGS. 1*a* and 1*b* has a central standard 1 that accommodates shafts that rotate around horizontal axes. The standard 1 as illustrated, has six shafts with rollers at the ends. Lower shafts 2, 3, and 4 cannot be adjusted in height. Shafts 2 and 3 have guide rollers, and shaft 4, which is powered, has a knurling roller. Upper shafts 5, 6, and 7 can be adjusted in height by a handwheel 8. Shafts 5 and 7, have guide rollers, and shaft 6, the shaft in the middle, is powered and has a knurling roller.

The device also has two slides 9 and 10 equipped with guide rollers 11 and 12, which are mounted in such a way that they can rotate around vertical axes and which can be displaced horizontally by means of handwheels 13 and 14.

It will be evident from FIGS. 1, 1*a* and 1*b* that two composite sections 15 can be finished simultaneously. The sections travel through the device in the direction indicated by arrow X. They are advanced by the knurling rollers, which are powered, and only guided by the other rollers, which are applied to the parts of the composite profile.

Figure 9:
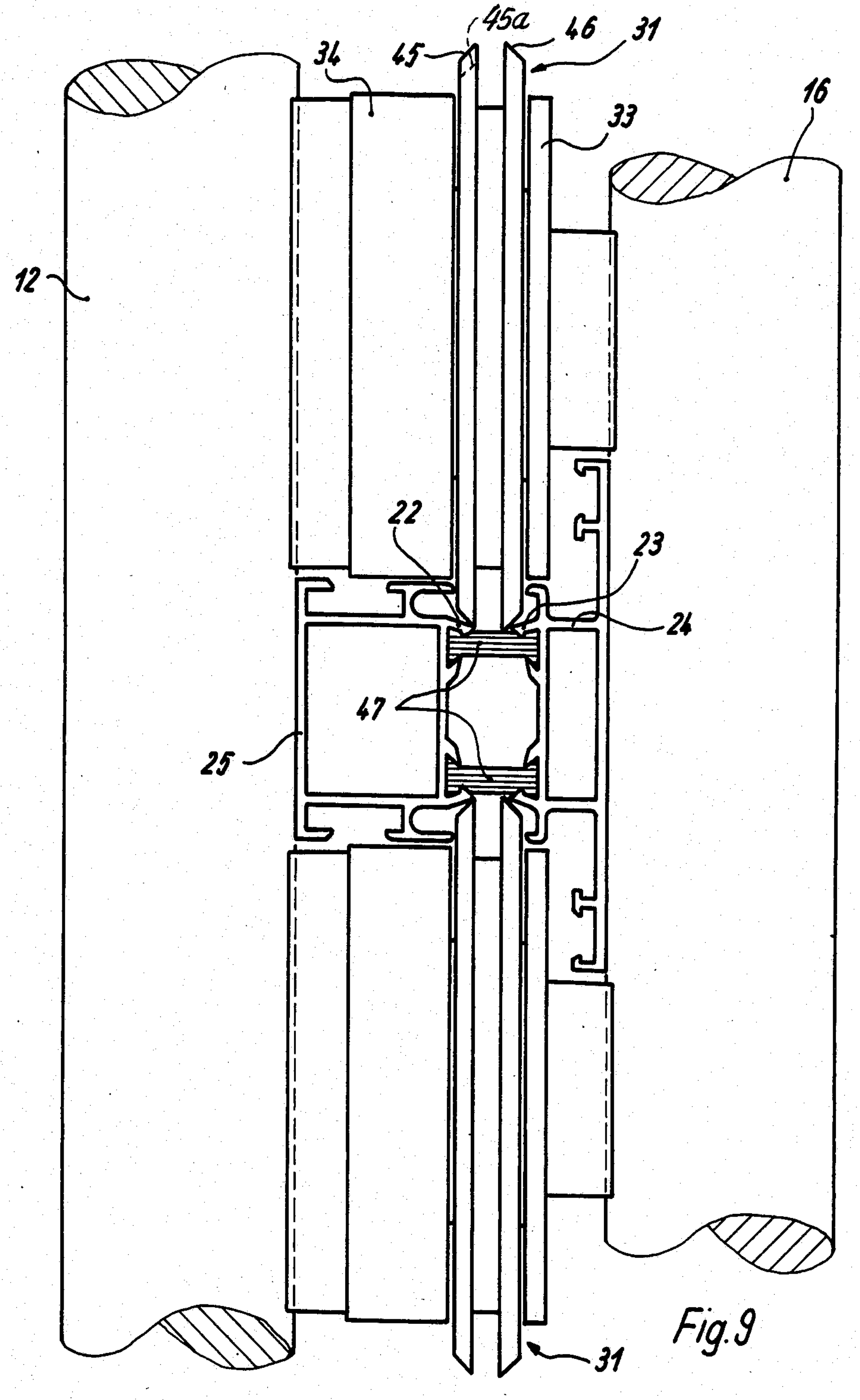
FIG. 9 illustrates a composite section with two insulating rods and two knurling rollers that operate in conjunction with the outer groove webs on the metal sections.

Standard 1 also accommodates, in addition to shafts 2 through 7, guide rollers 16, which rotate around vertical axes and only one of which is illustrated, in FIG. 9.

Figure 2:
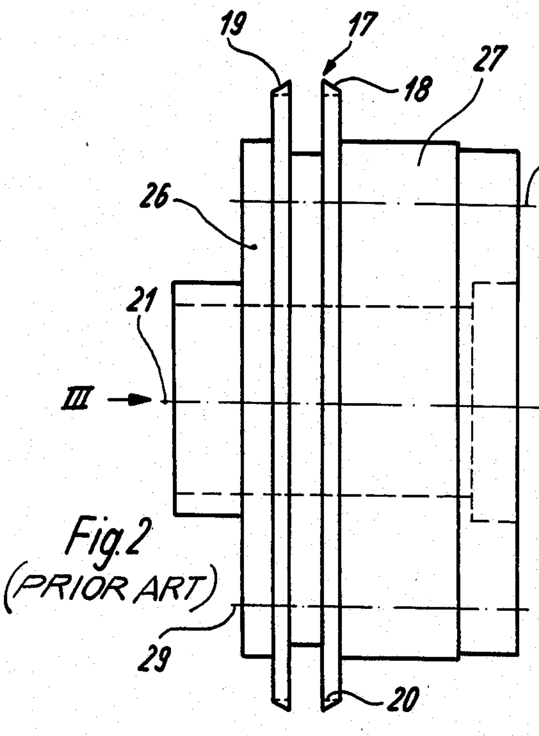
Fig.2 (PRIOR ART)
FIG. 2 is an elevation of the known knurling roller and its tensioning mechanism.
Figure 3:
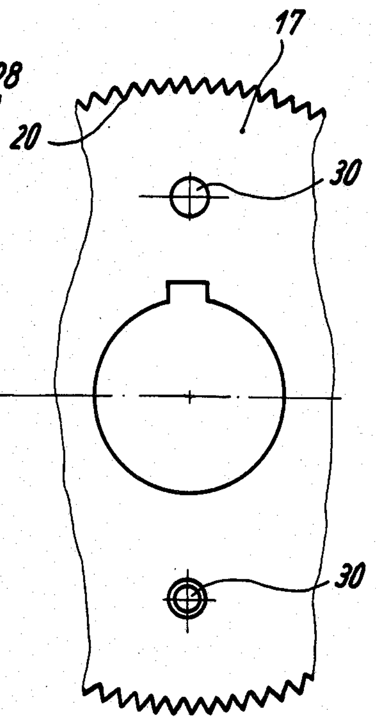
Fig.3 (PRIOR ART)
FIG. 3 is a view along the direction indicated by arrow III in FIG. 2.
Figure 4:
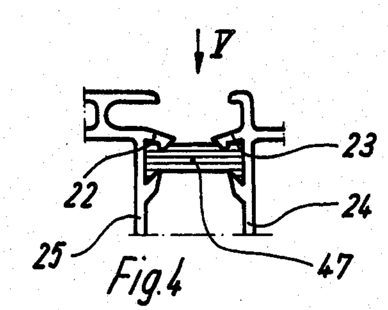
FIG. 4 is an elevation of a composite section subsequent to machining by the knurling roller illustrated in FIGS. 2 and 3.
Figure 5:
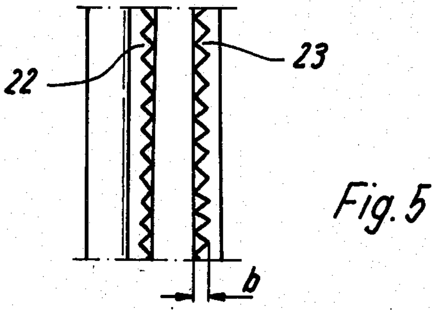
FIG. 5 is a view along the direction indicated by arrow V in FIG. 4.

The known knurling roller 17 mounted on shafts 4 and 6 and illustrated in FIGS. 2 and 3, has two separated, conical, toothed, circumferential surfaces 18 and 19. As will be evident from FIG. 2, since the bottom land 20 between each pair of teeth parallels the axis 21 of rotation of knurling roller 17, the teeth are triangular in section. This results, as illustrated in FIG. 5, in a wide knurled strip in the groove webs 22 and 23 in metal sections 24 and 25 that are shaped by knurling roller 17. The width b of the knurled strip equals the width of bottom land 20.

The disk-shaped knurling roller 17 in the known embodiment illustrated in FIGS. 2 and 3 is held between two annular disks 26 and 27 that rest against the lateral surfaces of the roller, where they are secured by screws that pass through passages 30 bored through the roller and that are indicated by the dot-and-dashed lines 28 and 29 in FIG. 2.

Figure 6:
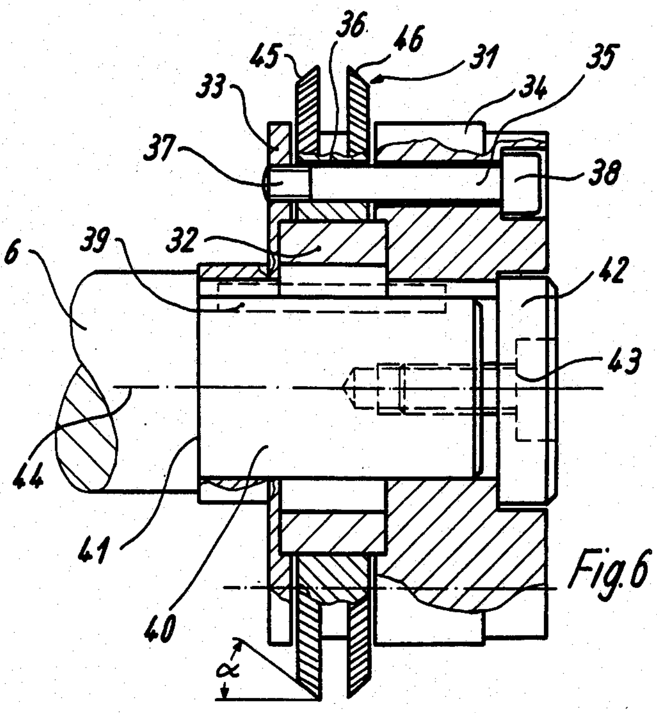
FIG. 6 is a partial vertical section of the knurling roller and mechanism in accordance with the invention as mounted on a powered shaft.

The disk-shaped knurling roller 31 in accordance with the invention that is illustrated in FIG. 6 is mounted in such a way that it can be displaced axially on a bushing 32 that is held between annular disks 33 and 34. The holding elements are screws 35 only one which is shown in FIG. 6. The shaft of each screw extends through a passage bored through knurling roller 31, its threaded end 37 is screwed into a threaded hole bored through annular disks 33 and 34, and its head 38 rests on an annular area of annular disk 34.

Annular disks 33 and 34 are attached by means of a key 39 to the end 40 of powered shaft 6 in such a way that they cannot rotate in relation to the shaft. Annular disk 33 rests against an abutting surface 41 on shaft 6 and annular disk 34 is secured by a terminal disk 42 that is fastened by a screw 43 to the end 40 of the shaft.

In one variation of the design illustrated in FIG. 6, bushing 32 can be in one piece and have an annular disk.

Knurling roller 31, which is mounted in such a way that it can slide along bushing 32 parallel to axis 44 of rotation, has two separated., conical, toothed, circumferential surfaces 45 and 46. The bottom land 45*a* between each pair of these teeth parallels the conical circumferential surface of roller 31, which is at an angle $\alpha$ of 50° to 60° to the horizontal.

Figure 7:
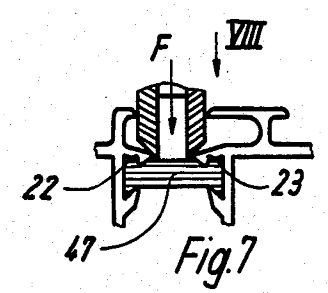
FIG. 7 shows the knurling roller illustrated in FIG. 6 while the joint is being produced.
Figure 7A:
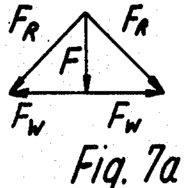
FIG. 7*a* is a diagram of forces.

The force F exerted by knurling roller 31 on the groove webs 22 and 23 that are to be shaped (FIG. 7) can be broken down, as illustrated in FIG. 7*a*, into the components FR and FW, which powerfully force groove webs 22 and 23 against insulating rod 47. When groove webs 22 and 23 have, as in the illustrated embodiment, a projection that extends toward insulating rod 47 and the rod has a recess that accommodates the projection, the projections will mold perfectly into the associated recess as the result of the force components illustrated in FIG. 7*a*.

Figure 8:
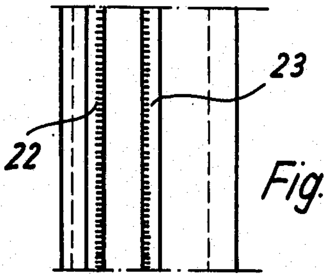
FIG. 8 is a view along the direction indicated by arrow VIII in FIG. 7.

The angle $\alpha$ of incidence of the conical circumferential surfaces 45 and 46 of knurling roller 31 ensures that groove webs 22 and 23 will have only a very narrow strip of knurling as illustrated in FIG. 8.

In one variation of the embodiment described, the composite profile can be kept stationary and the device, equipped with at least one knurling roller 17, advanced over it.

FIG. 9 illustrates a composite section with two insulating rods and two knurling rollers that operate in conjunction with the outer groove webs on the metal sections.

It will be appreciated that the instant specification and drawings are set forth by way of illustration and not limitation, and that various modifications and changes may be made without departing from the spirit and scope of the present invention.

What is claimed is:

1. In a device for fastening together the parts of a heat-insulated composite section consisting of two metal sections and of two parallel spaced apart insulating rods, in which the insulating rods engage grooves in the metal sections formed by groove webs, the device including means for shaping and forcing exterior groove webs against the insulating rods including disc-shaped knurled rollers and means releasably mounting the knurled rollers on shafts to roll the knurled rollers along the exterior groove webs to force the same into the insulating rods, the improvement wherein the knurled rollers each comprise two separated, conical, toothed, circumferential surfaces each at an angle of 50° to 60° to the axis of the shaft and bottom land between each pair of teeth is parallel to the conical circumferential surface and wherein the means mounting the knurled rollers comprises means mounting the rollers at opposite sides of the composite section and means for permitting axial play of each roller with respect to the shaft during the rolling of the knurled roller along the exterior groove web, wherein the axial play comprises axial displacement of the roller of 0.5 to 1 mm to each side out of an intermediate position.

2. The device as in claim 1, wherein the means permitting axial play comprises a bushing mounted between annular disks and wherein the disks are held together by screws that extend through passages bored through the knurled roller.

3. The device as in claim 2, wherein the bushing comprises one piece with an annular disk.

4. The device according to claim 1, wherein the means permitting axial play of the roller permits free axial displacement of the roller.

* * * * *